(12) United States Patent
Jang et al.

(10) Patent No.: US 7,760,520 B2
(45) Date of Patent: Jul. 20, 2010

(54) CURRENT CONTROLLED SWITCHING MODE POWER SUPPLY

(75) Inventors: Kyung Oun Jang, Incheon (KR); Yoo-Woong Hwang, Gyeonggi-do (KR)

(73) Assignee: Fairchild Korea Semiconductor, Ltd., Bucheon-Si (KR)

( * ) Notice: Subject to any disclaimer, the term of this patent is extended or adjusted under 35 U.S.C. 154(b) by 534 days.

(21) Appl. No.: 11/639,005

(22) Filed: Dec. 14, 2006

(65) Prior Publication Data
US 2007/0132438 A1    Jun. 14, 2007

(30) Foreign Application Priority Data
Dec. 14, 2006  (KR) .................... 10-2005-0122853

(51) Int. Cl.
*H02M 3/335*    (2006.01)
(52) U.S. Cl. ..................... 363/21.18; 363/49
(58) Field of Classification Search .............. 363/49, 363/21.1–21.13, 21.18; 323/901
See application file for complete search history.

(56) References Cited

U.S. PATENT DOCUMENTS

| | | | | |
|---|---|---|---|---|
| 6,091,234 A * | 7/2000 | Kitagawa | .................. | 323/244 |
| 6,665,197 B2 * | 12/2003 | Gong et al. | .............. | 363/21.01 |
| 6,775,164 B2 * | 8/2004 | Wong et al. | ................. | 363/147 |
| 7,391,629 B2 * | 6/2008 | Ryu et al. | ................. | 363/56.1 |

* cited by examiner

*Primary Examiner*—Jeffrey L Sterrett
*Assistant Examiner*—Fred E Finch, III
(74) *Attorney, Agent, or Firm*—Sidley Austin LLP

(57) ABSTRACT

A current controlled switching mode power supply is provided. A turn on/off time of a switching device is adjusted by controlling a leading edge blanking (LEB) time and an external drive current of the switching device by means of a switching controller, thus capable of preventing a switching current from being excessive due to a delay of a turn-off time of the switching device, which is caused by a circuit delay during a soft start of the switching mode power supply. Also, it is possible to prevent a switching current from being excessive due to a failure of accurately controlling a turn-off time of the switching device because of a delay caused when an output voltage (a voltage at a secondary winding of a transformer) of the switching mode power supply is designed to have a high voltage.

15 Claims, 8 Drawing Sheets

CURRENT CONTROLLED SWITCHING MODE POWER SUPPLY

CROSS REFERENCE TO RELATED APPLICATIONS

This application claims priority under 35 U.S.C. §119 to an application entitled "Current Controlled Switching Mode Power Supply" filed in the Korean Intellectual Property Office on Dec. 14, 2005 and assigned Ser. No. 2005-0122853, the contents of which are herein incorporated by reference in its entirety.

BACKGROUND

1. Field of the Invention

The present invention relates to a current controlled switching mode power supply, and more particularly, to an apparatus for adjusting a turn on/off time of a switching device by controlling a leading edge blanking (LEB) time and an external drive current of the switching device by means of a switching controller, thus capable of preventing a switching current from being excessive due to a delay of a turn-off time of the switching device, which is caused by a circuit delay during a soft start of the switching mode power supply. Also, the present invention can prevent a switching current from being excessive due to a failure in accurately controlling a turn-off time of the switching device because of a delay caused when an output voltage (a voltage at a secondary winding of a transformer) of the switching mode power supply is designed to have a high voltage.

2. Description of Related Art

FIG. 1 is a schematic circuit diagram of a conventional switching mode power supply (SMPS) 100. A conventional switching mode power supply includes a direct current (DC) voltage supply 110, a voltage output block 120, feedback circuit blocks 130a-b, and a switching controller 140. The DC voltage supply 110 includes a bridge diode rectifier 111 and a capacitor (C1) 112. The voltage output block 120 includes a transformer 121, a diode (D1) 122, capacitors (C2, C5) 124 and 125, and an inductor 123. The transformer 121 has a primary winding Lp and a secondary winding Ls. The feedback circuit block 130b includes an amplifier (not shown), a photo coupler 131, and a capacitor (C4) 132. The switching controller 140 includes a source/sink unit 141, a pulse width modulation (PWM) unit 142, an oscillator 144, a leading edge blanking (LEB) unit 145, a switching device 147, a switching device sensing resistor 148, a soft start unit 149, and a protection unit 150. The PWM unit 142 includes a PWM comparator 143, NOR gates 151 and 153, a latch circuit unit 152, and a driver 146. The switching device 147 may be a metal oxide semiconductor field effect transistor (MOSFET). Hereinafter, the switching device is also referred to as a MOSFET 147 and the switching device sensing resistor 148 is also referred to as a MOSFET sensing resistor 148. However, other types of switching devices, such as bipolar junction transistors, are also within the scope of the described SMPS.

An operation of the conventional switching mode power supply will be described below. When an alternating (AC) voltage is applied to the DC voltage supply 110, the bridge diode rectifier 111 rectifies the AC voltage to produce a DC voltage, which is smoothed by the capacitor (C1) 112. The DC voltage charges a capacitor C3. Voltage supply 110 provides supply voltage Vcc to the switching controller 140 at the "start" pin, coupled in parallel to capacitor C1. When the voltage of capacitor C1 increases, the supply voltage Vcc also increases. The switching controller 140 begins to be driven when the capacitor C1 is charged to a suitable predetermined level. During an initial operation of the switching mode power supply 100, the PWM unit 142 receives a soft start voltage (Vsoft) and a MOSFET sensing voltage (Vsense): the voltage across the MOSFET sensing resistor 148. During a normal operation after the start up operation, the PWM unit 142 receives a feedback voltage (Vfb) through source/sink 141 and the MOSFET sensing voltage (Vsense), and outputs pulses having a predetermined duty ratio to a gate terminal of the switching device 147. The switching device 147 repeats on/off operations in response to the pulses. Since the switching device 147 is in an off state when the switching mode power supply is initially driven, the smoothed DC current Ip does not flow through the primary winding Lp of the transformer 121. When the PWM unit 142 is in a state that it turns on the gate terminal of the switching device 147, the smoothed DC current Ip flows through the primary winding Lp of the transformer 121, building up the primary energy Ep stored in Lp, since the primary energy Ep is proportional to $(\frac{1}{2}) Lp \times Ip^2$. When the switching device 147 is in an off state, the smoothed DC current Ip cannot continue flowing through the primary winding Lp, and the primary energy Ep stored in the primary winding Lp is transferred to secondary energy Es of the secondary winding Ls of the transformer 121. The corresponding induced secondary current Is of the secondary winding is rectified to a positive current by the diode (D1) 122 and is smoothed by the capacitor (C2) 124. The corresponding smoothed voltage Vs across the capacitor (C2) 124 modified by the capacitor (C5) 125 and inductor 123 becomes the output voltage Vout of the switching mode power supply 100. The switching controller 140 decreases the duty ratio of the clock pulse, outputted by oscillator 144 when the voltage across the capacitor (C4) 132 increases, while the switching controller 140 increases the duty ratio of the outputted clock pulse when the voltage across the capacitor (C4) 132 decreases. When the duty ratio of the clock pulse increases, the transferred secondary energy Es and induced secondary current Is increase. When the duty ratio of the clock pulse decreases, the transferred secondary energy Es and induced secondary current Is decrease. The secondary current of the secondary winding is adjusted by the switching operation of the switching device 147. Adjusting the secondary current adjusts the magnitude of the output voltage of the switching mode power supply 100.

The LEB unit 145 of the switching controller 140 is an element for controlling a surge current that is generated during the initial operation of the switching device 147. That is, when the switching device 147 changes from the initial off state to the on state, a surge current is generated. In the time interval when the surge current is generated, the LEB unit 145 performs a window (control) function that makes the PWM unit 142 not change the switching device 147 to the off state.

The amplifier (not shown) of the feedback circuit block 130 amplifies the output voltage Vout to a predetermined level at which the photo coupler 131 is enabled to operate. When the amplified output voltage rises above a predetermined level, the photo coupler 131 operates to discharge the capacitor (C4) 132 through the current source/sink unit 141 of the switching controller 140. Due to this feedback loop, the secondary voltage Vs across the secondary winding Ls of the transformer 121 is regulated into an essentially constant value.

The soft start unit 149 prevents the development of an excessive stress of the entire circuit when a maximum energy is transferred to the secondary winding Ls during the initial operation of the switching mode power supply 100. To carry out this functionality, the soft start unit 149 gradually increases the voltage that is applied to the PWM comparator 143.

FIG. 2 illustrates an excessive switching current generated during the initial operation (i.e., the Soft Start) of the conventional switching mode power supply 100. During the initial operation the switching device 147 is in the on state at every falling edge of the oscillator clock. During the initial operation, the soft start voltage Vsoft is lower than the MOSFET sensing voltage Vsense. PWM comparator 143 compares these voltages and PWM unit 142 turns off the switching device 147. This off state is changed to an on state at the falling edge of the oscillator clock, from oscillator 144. In the following, the term "minimum turn-on time" means the time it takes to change the state of the switching device 147 from off to on.

In response to the change of its input voltage, the PWM unit 142 outputs a control voltage to turn the switching device 147 from the on state to the off state with a time delay. This time delay is due in part to a circuit delay associated with the signal propagation delay across the PWM unit 142 and to a delay caused by the LEB unit 145. Due to this time delay, the MOSFET sensing current (drain current) $I_{drain}$ passing through the switching device 147 becomes excessive, as illustrated in FIG. 2. If the MOSFET sensing current becomes excessive, the voltage provided on the MOSFET becomes excessive over the inherent voltage limit of the MOSFET when the MOSFET is off. The MOSFET acting as the switching device is very likely to be broken down due to the excessive voltage over the inherent voltage limit of the MOSFET makes.

The above problems also occur when the output voltage set by a user at the secondary winding of the transformer 121 is high. Therefore, these problems are more severe in high voltage systems. In FIG. 2, $V_{soft}$ is a voltage from the soft start unit 147 and it represents an increasing voltage having discrete levels. $I_{drain}$ represents a drain current in FIG. 1 and it has a curve shown in FIG. 2 as a result of comparison between $V_{soft}$ and $V_{sense}$.

SUMMARY

Briefly and generally, in embodiments of the present invention a switching mode power supply is capable of preventing a switching device current from being excessive due to a delay of the switching-off of the switching device, caused by circuit delay during a soft start. In some embodiments a switching mode power supply is capable of preventing a switching device current from being excessive when an output voltage of a secondary winding exceeds the limit voltage.

In some embodiments, a switching mode power supply is capable of adjusting a turn on/off time of a switching device by controlling a leading edge blanking (LEB) time and an external drive current of the switching device through a switching controller.

In some embodiments a switching mode power supply includes a switching device; a pulse width modulation (PWM) unit for controlling on/off operations of the switching device by comparing a feedback voltage from a soft start unit or a voltage output unit with a sensing voltage of a switching sensing resistor, in series with the switching device; and a switching device turn on/off time controller for controlling a leading edge blanking (LEB) time of an LEB unit of the PWM unit and controlling an external drive current from a supply voltage supplied to a driver of the PWM unit, such that a turn on/off time of the switching device is controlled.

In some embodiments a switching mode power supply includes a switching device; a PWM unit for controlling on/off operations of the switching device by comparing a feedback voltage from a soft start unit or a voltage output unit with a sensing voltage of a switching sensing resistor, in series with the switching device; and an over-voltage controller for comparing the switching sensing voltage with a threshold voltage to generate a first output voltage, comparing the first output voltage with an output signal of the soft start unit to generate a second output voltage, the soft start unit functioning to gradually increase an output voltage of the voltage output unit when the switching mode power supply is initially driven, and controlling an LEB of an LEB unit of the PWM unit by using the second output voltage and an output signal of a counter, and controlling an external drive current derived from a voltage supplied to a driver of the PWM unit, such that a turn on/off time of the switching device is controlled.

DETAILED DESCRIPTION

In the following, description of well known elements will be omitted for clarity. It will be understood that when an element or block is referred to as being connected to another element or block, the connection can be direct or through intervening elements or blocks.

Figure 3:
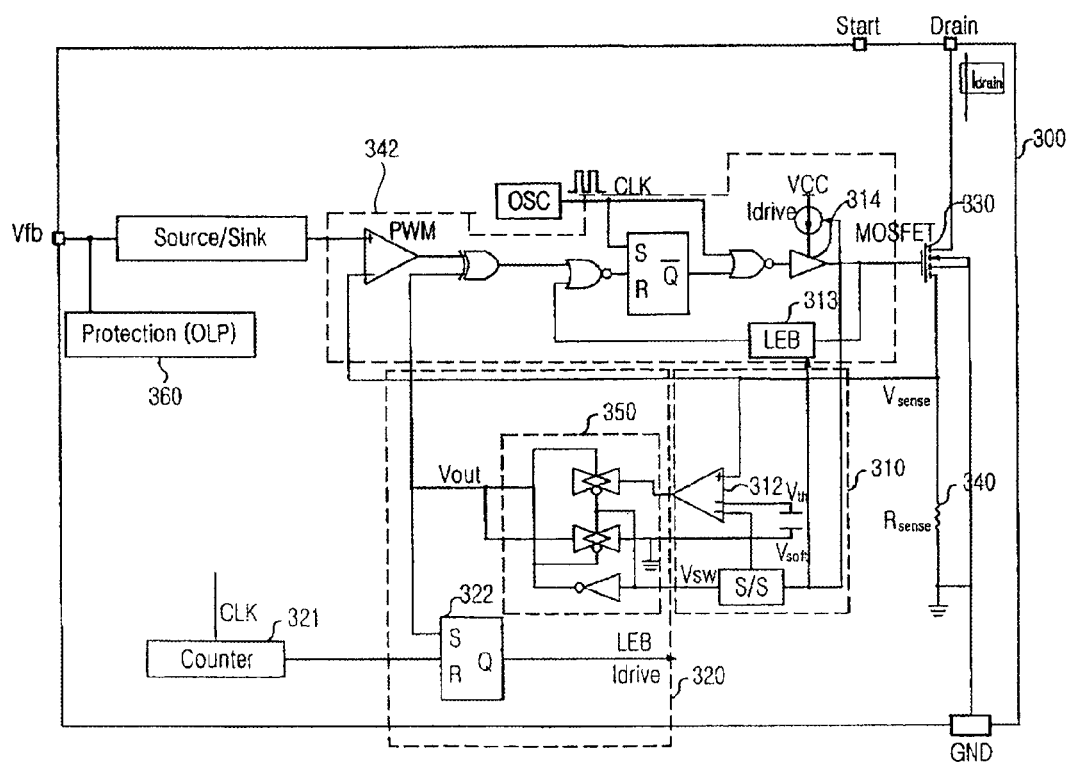
FIG. 3 illustrates a circuit diagram of a switching controller of a switching mode power supply according to some embodiments.

FIG. 3 is a circuit diagram of a switching controller 300 of a switching mode power supply according to an embodiment. The switching controller 300 may operate in connection of a DC voltage supply, a voltage output block, and a feedback circuit block, which can have the same structures as those of FIG. 1 or any one of their numerous equivalents. For this reason, these elements will not be shown here. Further, the elements to which no reference numerals or symbols are assigned can also have the same structures as those of FIG. 1, or any equivalent structure.

FIG. 3 illustrates a PWM unit which controls on/off operations of a switching device 330 by comparing a soft start voltage of a soft start unit or a feedback voltage Vfb of a voltage output block with a switching sensing voltage Vsense of a switching sensing resistor 340. A first comparator 312, serving as an over-current protection circuit, compares the switching sensing voltage Vsense with the soft start voltage Vss of the soft start unit. Soft start voltage Vss functions to gradually increase the output voltage of the voltage output block when the switching mode power supply is initially driven. A MOSFET turn-on time controller 310 transfers the output voltage of the first comparator 312 through a second comparator 350 to the PWM unit 342. The MOSFET turn-on time controller 310 also controls the LEB time of the LEB unit 313 using the soft start voltage Vss, and controls the external drive current Idrive derived from the voltage supplied to the driver 314 of the PWM unit. In this manner, the MOSFET turn-on time is controlled.

An over voltage controller 320 receives the output signal of the counter 321 and the voltage obtained by comparing the output voltage of the MOSFET turn-on time controller 310 with the output voltage of the soft start unit. FIG. 3 represents a situation during the soft start. The over voltage controller 320 controls the LEB time of the LEB unit 313 of the PWM unit 342 by using an output signal of an RS latch 322. The output signal Q of RS latch 322 is coupled into Idrive and LEB unit 313, as will be demonstrated in FIG. 5, which represents a phase of the operation after the soft start ends. Output signal Q controls the MOSFET turn-on time by controlling the external drive current Idrive derived from the voltage supplied to the driver 314 of the PWM unit.

Figure 4:
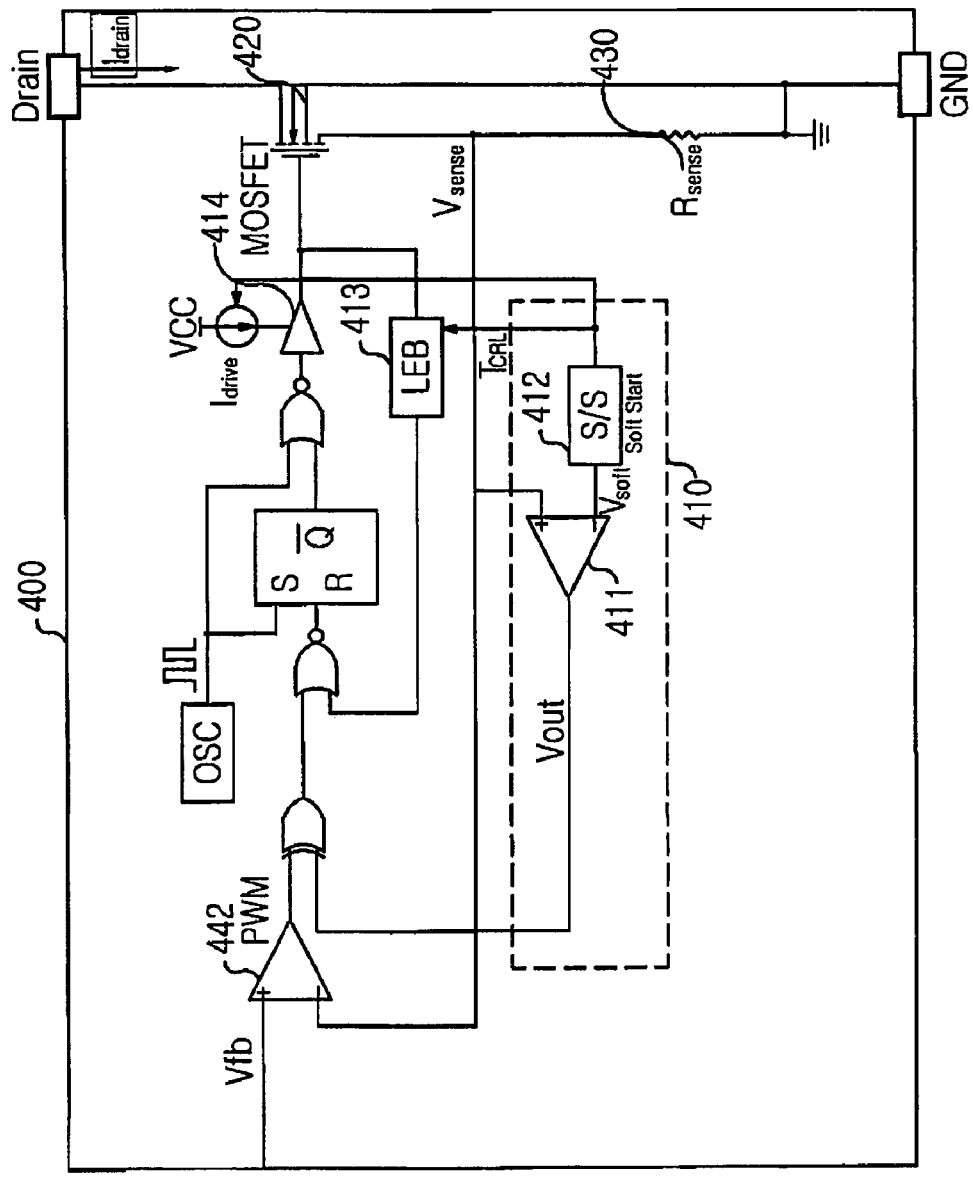
FIG. 4 illustrates a circuit diagram of a switching controller having a MOSFET turn on/off time controller according to some embodiments.

FIG. 4 illustrates a circuit diagram of a switching controller 400 having a MOSFET turn-on time controller according to another embodiment. In the switching mode power supply, the elements that are not illustrated in FIG. 4 can be similar to the corresponding elements in FIG. 1, or equivalents thereof. A comparator 411 serving as an over-current protection circuit compares the switching sensing voltage Vsense of the switching sensing resistor 430 with the soft start voltage Vss of the soft start unit 412, which functions to gradually increase the output voltage of the voltage output block when the switching mode power supply is initially driven. The MOSFET turn-on time controller 410 transfers the output voltage of the comparator 411 to the PWM unit 442. Also, the MOSFET turn-on time controller 410 controls the LEB time of the LEB unit 413 by using the soft start voltage Vss, and controls the external drive current ($I_{drive}$) derived from the voltage supplied to the driver 414 of the PWM unit. In this manner, the turn-on time of the switching device 420 is controlled.

Excessive currents in the MOSFET can be avoided e.g. by reducing the turn-on time. The turn-on time can be reduced by reducing the LEB time. The LEB time can be reduced by increasing $I_{drive}$.

The switching device 420 may be a metal oxide semiconductor field effect transistor (MOSFET), a bipolar junction transistor (BJT), or an insulated gate bipolar transistor (IGBT).

Figure 5:
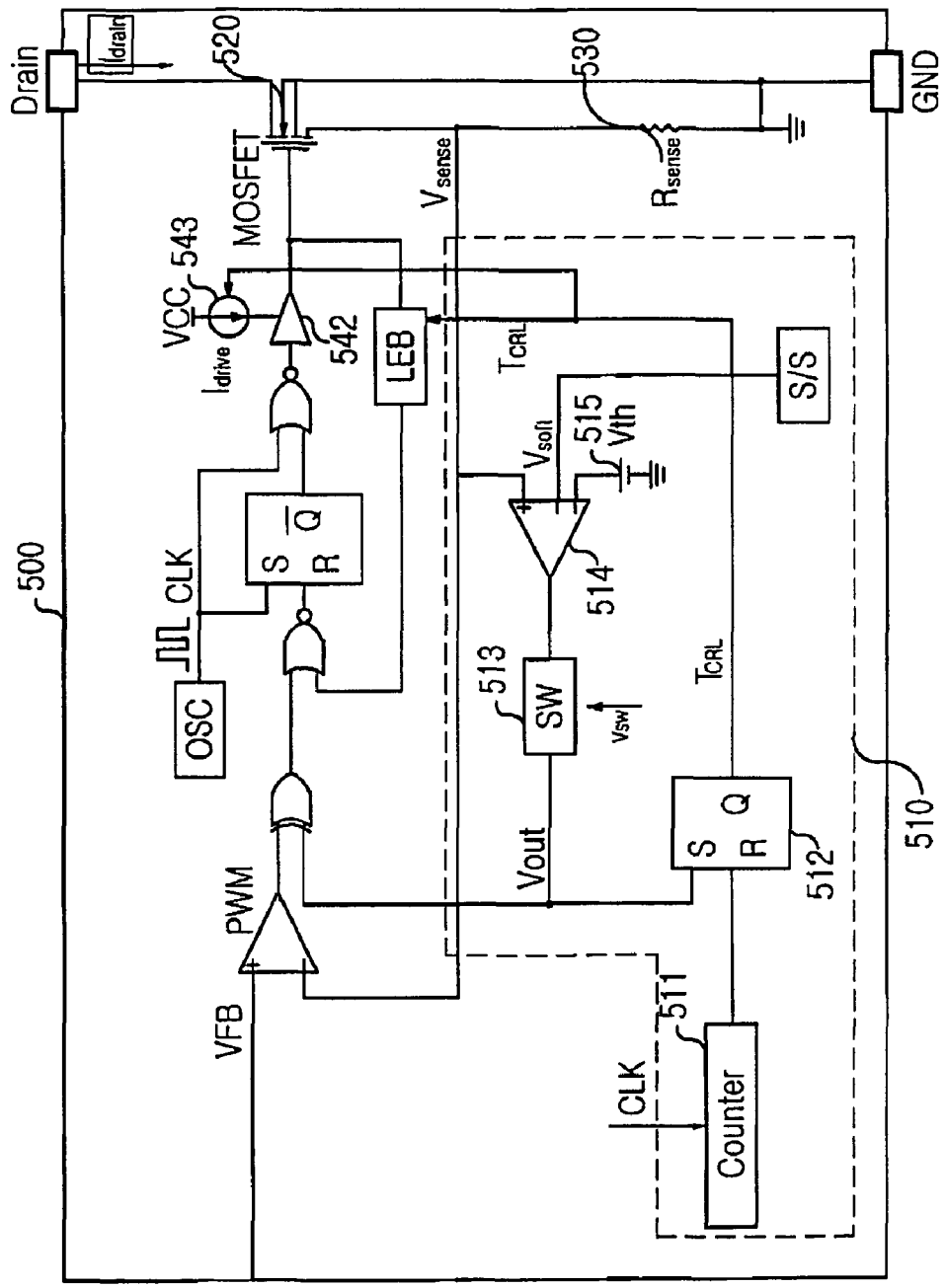
FIG. 5 illustrates a circuit diagram of a switching controller having an over voltage control unit according to some embodiments.

FIG. 5 illustrates a circuit diagram of a switching controller 500 having an over voltage control unit according to another embodiment. In the switching mode power supply, the elements that are not illustrated in FIG. 5 can be similar to the corresponding elements in FIG. 1 or equivalents. An over-voltage controller 510 includes a first comparator 514, a second comparator 513, and a latch 512. The first comparator 514 compares the switching sensing voltage Vsense of a switching sensing resistor 530 with a threshold voltage Vth 515. Vsw is the signal representing whether or not the Soft Start is over. When the Soft Start is over, the first comparator 514 can work as detector of the output short condition.

The second comparator 513 compares the output voltage of the first comparator 514 with the soft start voltage Vss, which functions to gradually increase the output voltage of the voltage output block when the switching mode power supply is initially driven. The latch 512 controls the LEB time of the LEB unit by using the output voltage Vout of the second comparator 513 and a counter signal of a counter 511 to generate a latch signal. The latch signal also controls the external drive current $I_{drive}$ derived from the voltage supplied to the driver 542 of the PWM unit. The counter 511 receives a clock from an oscillator of the switching controller 500 and outputs the counter signal to the latch 512.

Although not shown, the soft start unit may include a converter and a comparator. The converter can receive a sequentially increasing digital signal and can convert it into an analog signal. The comparator can compare the output signal of the converter with a first reference voltage to output a control signal for controlling an operation of an internal switch. Also, the converter can include a counter for outputting the sequentially increasing digital signal; a digital to analog converter (DAC) for converting the digital signal into an analog signal; and first and second transmission gates for selectively outputting the output signal of the DAC and a second reference voltage in response to the output signal of the comparator.

When the switching sensing voltage Vsense is higher than a limit voltage, the output voltage of the system is determined as exceeding the limit voltage. If the MOSFET sensing current becomes excessive, the voltage applied across the MOSFET becomes excessive over the inherent voltage limit of the MOSFET when the MOSFET is off. The MOSFET acting as the switching device is very likely to break down due to the excessive voltage over the inherent voltage limit of the MOSFET.

The second comparator 513 is also referred to as an over-current protection (OCP) circuit. Its output signal is also referred as an OCP signal. When this OCP signal is high, the external drive signal ("drive_control") is set to a high level by the RS latch 512. The LEB block and the output drive block 543 receive the external drive signal and in response reduce the minimum turn-on time of the switching device 520. Switching controller 500 is designed to perform an auto restart by an over load protection (OLP) function by protection unit 360 of FIG. 3 after a predetermined time elapses. However, if the output voltage is released from the excessive state before the feedback voltage Vfb reaches the OLP voltage, it is recognized as being returned to the normal operation and the minimum turn-on time can be increased again. For example, if the OCP signal goes from high to low and remains low for eight periods of the counter, the switching mode power supply can return to the normal operation mode. In other embodiments other timing schemes are applied.

Figure 6:
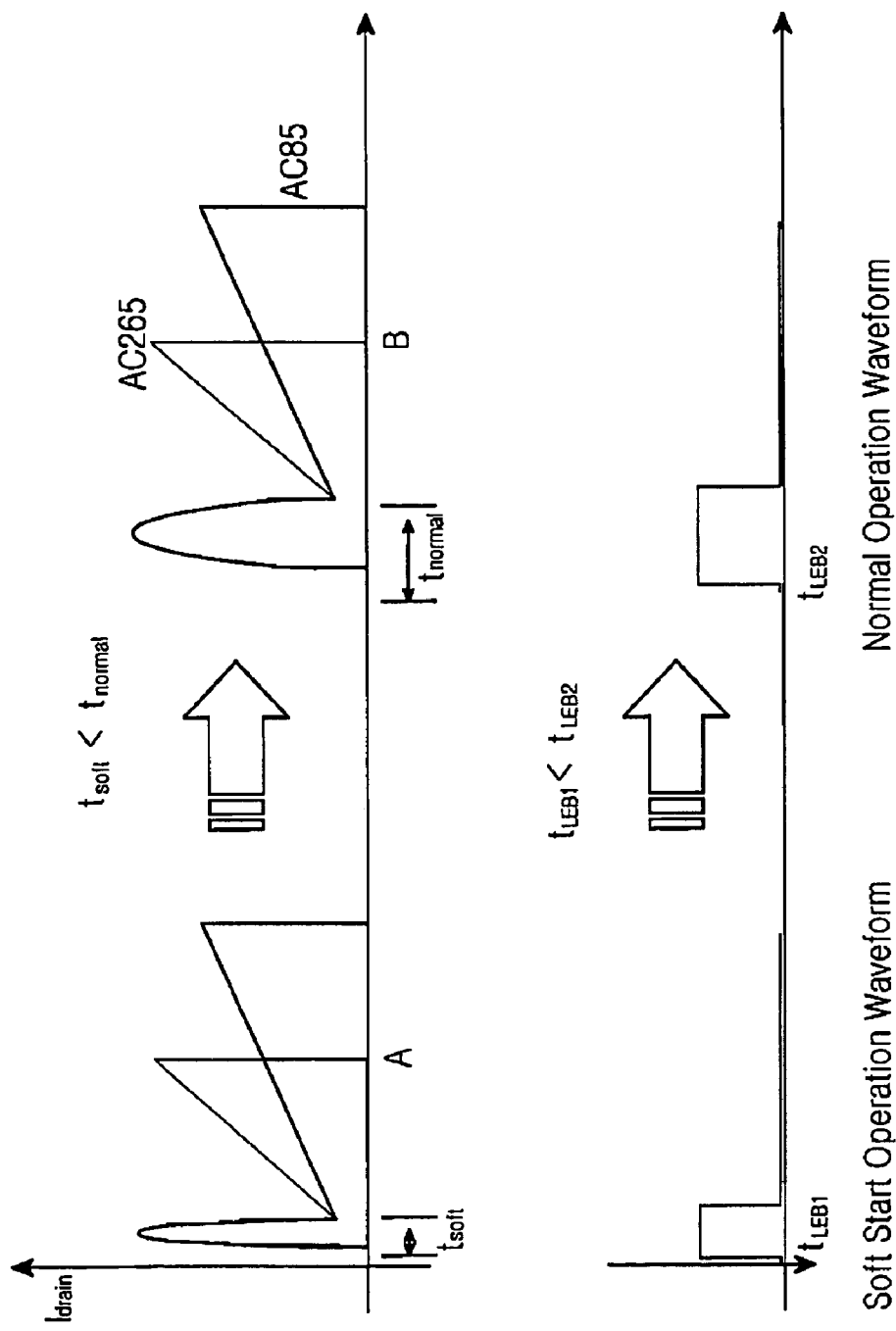
FIG. 6 illustrates output waveforms of a switching device current in the switching mode power supply according to some embodiments.
Figure 7:
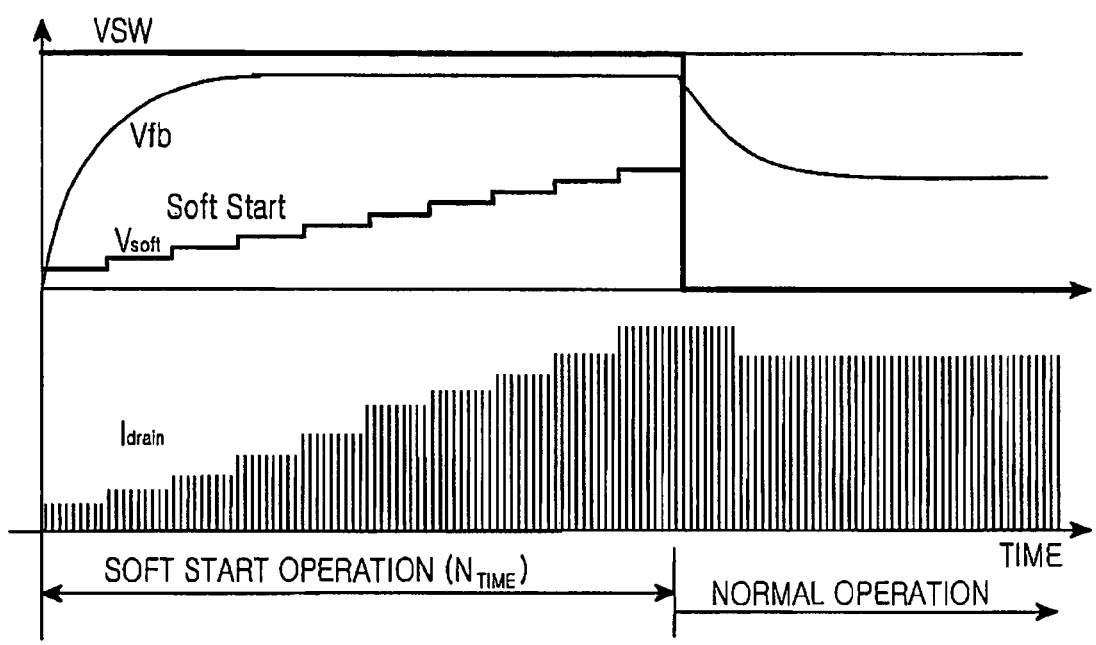
FIG. 7 illustrates a switching device current generated during a soft start of the switching mode power supply according to some embodiments.
Figure 8:
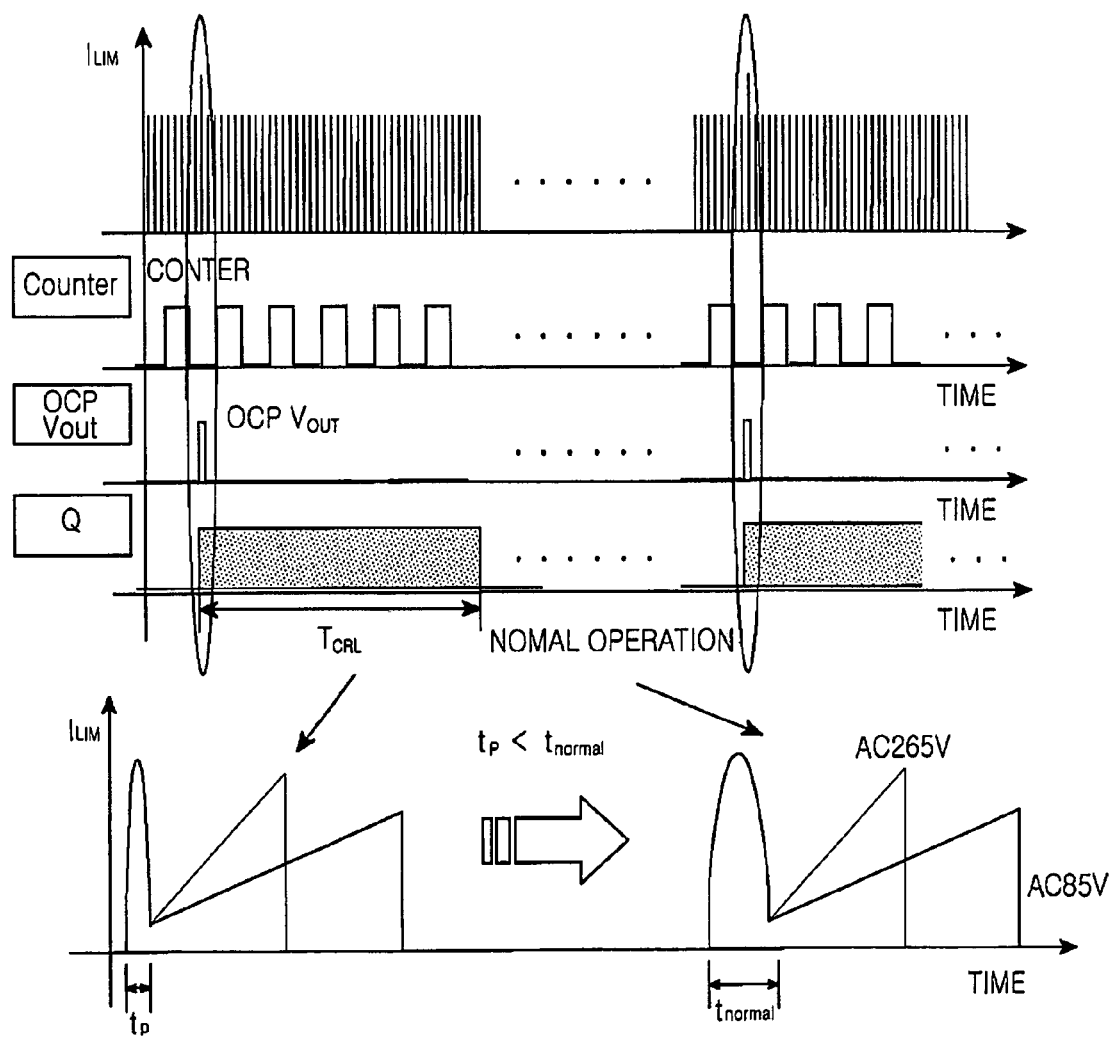
FIG. 8 illustrates output waveforms of a switching device current in the switching mode power supply according to the embodiment of the present invention, comparing the switching current waveform with a waveform of a counter and an output of an over current protection circuit.

An operation of the switching mode power supply will be now described in relation to FIGS. 6-8. In the initial operation of the switching mode power supply, the soft start voltage Vss gradually increases during the soft start operation. In the soft start period, the switching device 330 is off due to the circuit delay of the PWM unit and the delay of the LEB unit 313. A possible consequence is that the switching current can become excessive. Therefore, the switching device 330 may become damaged. Through the operation of the MOSFET turn-on time controller 310, the MOSFET turn-on time is controlled by adjusting a LEB time and the external drive current, thereby solving the above-described problem.

FIG. 6 is a timing diagram illustrating output waveforms of the switching device current in the switching mode power supply. It illustrates the LEB time in the initial driving period (i.e., the Soft Start operation) and the normal driving/operation period of the switching mode power supply.

FIG. 6 shows drain current pulses and LEB signals. The left panels show the waveform during soft-start time and the right panels show the waveform during normal operation. The cycle by cycle peak drain current limit circuit uses the Power MOSFET sense ratio and sense resistance. When the MOSFET turns on, there usually exists a high spike current through the MOSFET. This is caused by primary side capacitance and secondary side rectifier reverse recovery. This may cause premature termination of the switching pulse if it exceeds the over-current threshold. The LEB circuit inhibits the over current comparator for a short time after the MOSFET turns on.

The "rectifier reverse recovery" can be illustrated as follows. Diode D1 (labeled 122 in FIG. 1) is a secondary side rectifier diode. When MOSFET (147 in FIG. 1, 330 in FIG. 3) turns off, D1 turns on. When the MOSFET turns on, D1 turns off. Usually, diodes have a "reverse recovery current" that flows in the negative direction at the moment of turning off. This current can be reflected to the MOSFET by the transformer 121 and this reflected current can exceed the reference current, causing a premature termination.

time of MOSFET's gate-drain capacitance. Correspondingly, in some embodiments during soft time and output short conditions, the gate drive current is temporarily increased. Concurrently, the LEB time is reduced. The reduction of the LEB time, as demonstrated in FIG. 6, may lead to the decrease of the minimum turn on time. In normal operations, during the spike of Idrain, the PWM block should turn the MOSFET OFF due to the high spike current. LEB unit 313 may inhibit the PWM unit for a LEB time after the MOSFET is turned on. During Soft Start, or output short, operation, LEB unit 313 can make PWM unit, and equivalently, the first comparator 312, disabled during the LEB time.

Figure 1:
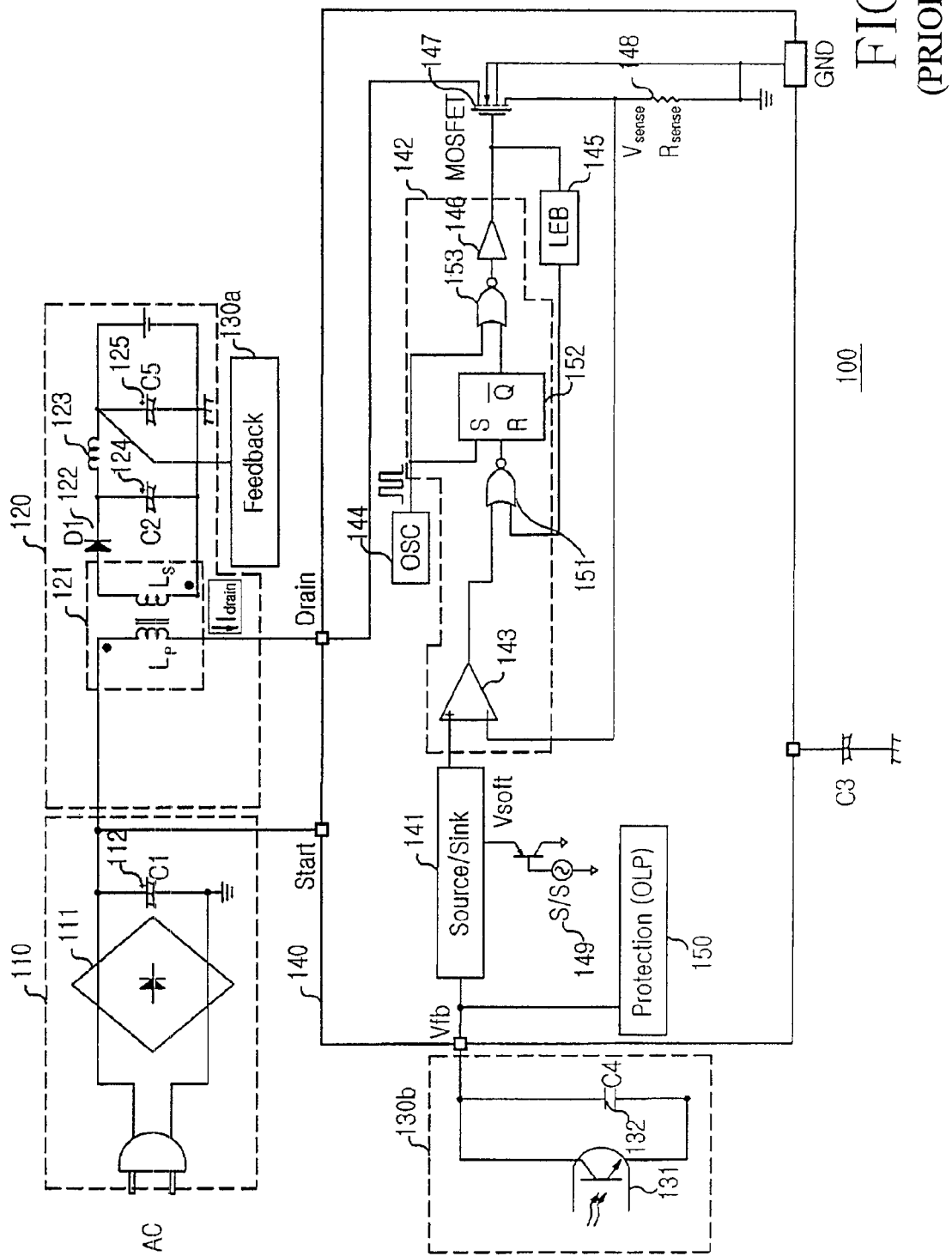
FIG. 1 illustrates a schematic circuit diagram of a conventional switching mode power supply.

As illustrated e.g. in FIG. 1, the MOSFET 147 can be connected to the transformer 121. When the MOSFET 147 turns on, the drain current Idrain rises approximately linearly, dictated by the known law of the time dependence of the inductor's current. The slope of the approximately linear rise is determined by the AC voltage Vac divided by the inductance Lm: d(Idrain)/dt~Vac/Lm. In the right panel the AC265 and AC85 waveforms indicate that the AC voltages indeed affect the slope of the linear rise of Idrain.

The various blocks operate in some embodiments as follows. The MOSFET turn-on time controller 310: during normal operation Vsoft (applied between the first comparator 312 and the S/S block) can be disabled and Vth can essentially become the inverting input of the first comparator 312. The first comparator 312 may determine whether or not an output short condition occurred. During a Soft Start operation Vth can become disabled and Vsoft becomes the inverting input of the first comparator 312. Accordingly, Idrain can be limited to a step form.

The over voltage controller 320: during normal operation, the over voltage controller 320 may determine whether or not an output short condition occurred. If an output short condition indeed occurred, over voltage controller 320 may determine whether the output short condition persists.

The second comparator 350: can work as a multiplexer in some embodiments. During normal operation Vout can be a high signal. During a Soft Start operation Vout can become the input of the first comparator 312.

The LEB unit 313: can inhibit the first comparator 312 for a short time after the MOSFET 330 is turned on in some embodiments.

The PWM unit 342: can control the magnitude of drain current Idrain. The PWM unit 342 can operate during normal operation. The PWM unit 342 may not work during soft start or output short condition. The PWM unit 342 can compare Vsense to Vfb. If Vsense becomes larger than Vfb, the PWM unit 342 can turn MOSFET 330 OFF.

The lower panel of FIG. 6 shows how some embodiments can control the duration of the high current spike. The LEB voltage is shown as a function of time during different operations. These embodiments employ different LEB times during different operations. During Soft Start operations, the high current spike can be reduced to reduce the minimum turn on time. In FIG. 6 $t_{soft}$ is the duration of the current spike and $t_{LEB}$ is the LEB time of the LEB circuit. During normal operation, the high current spike can be increased to improve the Electro-Magnetic Interference (EMI). In some embodiments, the time scale of the above waveforms is microseconds.

FIG. 7 is a diagram illustrating the switching device current generated during the soft start of the switching mode power supply according to some embodiments. Vsoft can be an internally generated step voltage to control the drain current Idrain during a Soft Start operation. Vsoft can also be the reference voltage contributing to making Idrain follow a step form. Vss can be equal to Vsoft. Vsense is a sensing voltage that senses drain current Idrain. Vsense assists the control circuit to sense Idrain. In some embodiments, the time scale of the above waveforms is milliseconds.

Figure 2:
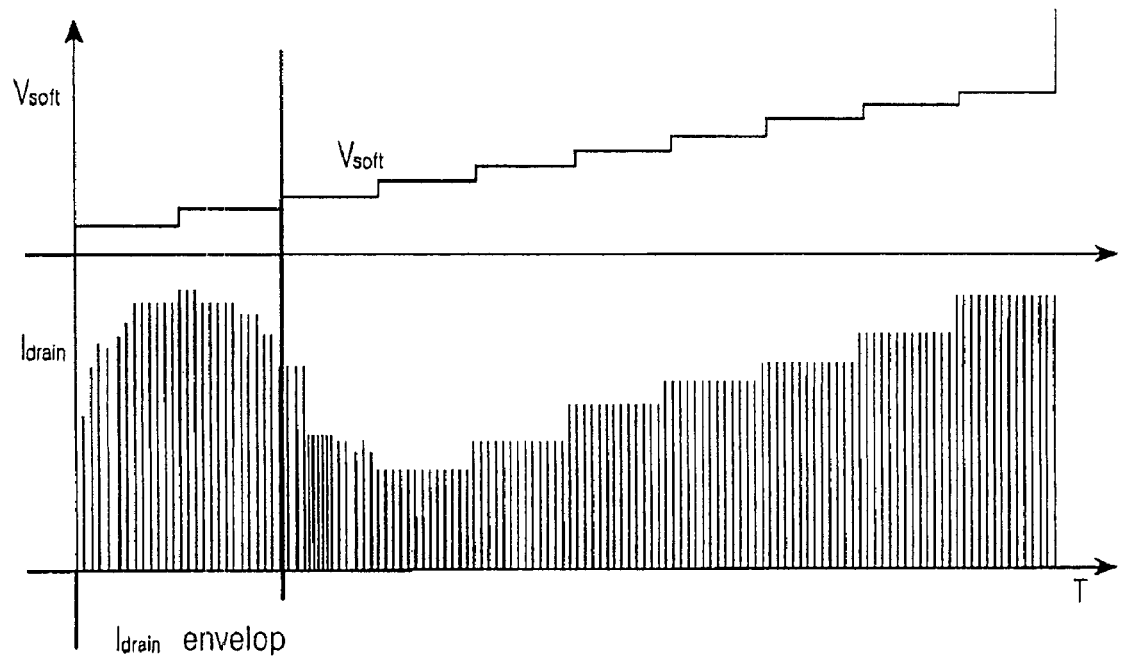
FIG. 2 illustrates an excessive switching device current generated during a soft start of the conventional switching mode power supply.

The waveforms of FIG. 7 can be compared to that of FIG. 2. Both FIG. 2 and FIG. 7 illustrate a sequence of pulses, not a single pulse. FIG. 2 illustrates the instability of waveforms in certain prior arts. This instability can be reduced by controlling the minimum turn on time, as illustrated in FIG. 7.

FIG. 8 is a timing diagram illustrating waveforms of the switching device current, the waveform of the counter and the output of an over current protection circuit in some embodiments. As illustrated in FIGS. 7 and 8, the switching controller controls the LEB time and the external drive current of the switching device and thus the turn-on time of the switching device is adjusted, thereby preventing the excessive switching current problem.

During normal operation, the negative input of first comparator 514 is an essentially constant reference voltage. If a sudden output short condition occurs, the 514 unit reduces the minimum turn on time. Unless a continuous OCP Vout 'high' signal is detected, the minimum turn on time will be returned to normal operation after the 8-counter's period, because a not-continuous OCP Vout 'high' signal means the output short conditions have been suppressed. In effect, the OCP Vout is the reset signal for the counter 321.

The waveform Q becomes "enabled" (high) during output short conditions. The counter 321 sends a signal after 8 clock cycles, as shown. During an output short condition, OCP Vout signal enters continuously. However, if the output short condition is removed, the counter 321 will not be reset anymore.

As described above, the switching controller can control the turn on/off time of the switching device by adjusting the LEB time and the external drive current of the switching device. Therefore, it is possible to solve the problem that the switching current becomes excessive because the switching device is not turned on due to the circuit delay during the soft start of the switching mode power supply. Also, the switching mode power supply can prevent the excessive switching current that is caused when the voltage of the secondary winding is excessive. Consequently, embodiments can provide a high-efficiency current-controlled switching mode power supply.

The foregoing embodiments are merely exemplary and are not to be construed as limiting the scope of the present invention. The present teachings can be readily applied to other types of apparatuses, circuits and operations. The description of the embodiments is intended to be illustrative only, and not to limit the scope of the claims. Many alternatives, modifications, and variations will be apparent to those skilled in the art. Therefore, the scope of the invention is limited only by the following claims.

What is claimed is:

1. A switching mode power supply comprising:
 a switching device;
 a pulse width modulation (PWM) unit including a driver at an output terminal, wherein the PWM unit is for comparing a voltage from a soft start unit or a feedback voltage from a voltage output unit with a switching sensing voltage of a switching sensing resistor after passing through the switching device and for controlling on/off operations of the switching device by using the result of the comparison which is output through the driver; and
 a switching device turn on/off time controller for controlling a MOSFET Gate Drive Current (Idrive) from a supply voltage supplied to the driver and comprising the soft start unit for controlling a leading edge blanking (LEB) time of a LEB unit of the PWM unit, such that a turn on/off time of the switching device is controlled.

2. The switching mode power supply of claim 1, wherein the switching device turn on/off time controller comprises a comparator for comparing the switching sensing voltage with the voltage from the soft start unit, which functions to gradually increase an output voltage of the voltage output unit when the switching mode power supply is initially driven, and transferring the resulting voltage to the PWM unit.

3. The switching mode power supply of claim 1, wherein the switching device is one of a metal oxide semiconductor field effect transistor (MOSFET), a bipolar junction transistor (BJT), and an insulated gate bipolar transistor (IGBT).

4. The switching mode power supply of claim 1, further comprising a DC voltage supplying unit for converting AC voltage into DC voltage and supplying the DC voltage to the voltage output unit and the switching controller.

5. A switching mode power supply comprising:
 a switching device;
 a pulse width modulation (PWM) unit including a driver at an output terminal, wherein the PWM unit is for comparing a voltage from a soft start unit or a feedback voltage from a voltage output unit with a switching sensing voltage that is applied to a switching sensing resistor after passing through the switching device and for controlling on/off operations of the switching device by using the result of the comparison which is output through the driver; and
 an over voltage controller for comparing the switching sensing voltage with a threshold voltage to generate a first output voltage, comparing the first output voltage with an output signal of the soft start unit to generate a second output voltage, the soft start unit functioning to gradually increase an output voltage of the voltage output unit when the switching mode power supply is initially driven, and controlling a leading edge blanking (LEB) time of an LEB unit of the PWM unit by using the second output voltage and an output signal of a counter, and controlling a MOSFET Gate Drive Current (Idrive) derived from a voltage supplied to the driver, such that a turn on/off time of the switching device is controlled.

6. The switching mode power supply of claim 5, wherein the over voltage controller comprises:
 a first comparator for comparing the switching sensing voltage with the threshold voltage;
 a second comparator for comparing the output voltage of the first comparator with the output signal of the soft start unit, which functions to gradually increase the output voltage of the voltage output unit during the initial driving of the switching mode power supply; and
 a latch for controlling the LEB time of the LEB unit by using the output voltage of the second comparator and the output signal of the counter, and generating a latch signal for controlling the MOSFET Gate Drive Current (Idrive) derived from the voltage supplied to the driver of the PWM unit.

7. The switching mode power supply of claim 6, wherein the counter receives a clock from an oscillator disposed in the switching controller and outputs the counter signal to the latch.

8. The switching mode power supply of claim 5, wherein the switching device is one of a metal oxide semiconductor field effect transistor (MOSFET), a bipolar junction transistor (BJT), and an insulated gate bipolar transistor (IGBT).

9. The switching mode power supply of claim 5, further comprising a DC voltage supplying unit for converting AC voltage into DC voltage and supplying the DC voltage to the voltage output unit and the switching controller.

10. The switching mode power supply of claim 5, wherein when the sensing voltage of the switching device is higher than a rated voltage, the over voltage controller determines an output voltage of a system as exceeding the rated voltage.

11. A switching mode power supply comprising:
 a switching device;
 a pulse width modulation (PWM) unit including a driver at an output terminal, wherein the PWM unit is for comparing a voltage from a soft start unit or a feedback voltage from a voltage output unit with a switching sensing voltage that is applied to a switching sensing resistor after passing through the switching device, controlling off operations of the switching device by using the result of the comparison which is output through the driver, and controlling on operations of the switching device according to a clock signal;
 a switching device turn on/off time controller for comparing the switching sensing voltage with an output voltage of a soft start unit, which functions to gradually increase an output voltage of the voltage output unit when the switching mode power supply is initially driven, controlling a leading edge blanking (LEB) time of an LEB unit of the PWM unit by using the output voltage of the soft start unit, and controlling a MOSFET Gate Drive Current (Idrive) derived from a voltage supplied to the driver, such that a turn on/off time of the switching device is controlled; and
 an over voltage controller for comparing an output voltage according to a result of comparing the switching sensing voltage with a predetermined threshold voltage with the output voltage of the soft start unit, to generate a first output voltage, determining an over current state according to the first output voltage, and controlling the LEB time and a MOSFET Gate Drive Current (Idrive) derived from a voltage supplied to the driver in the over current state.

12. The switching mode power supply of claim 11, wherein the switching device is one of a metal oxide semiconductor field effect transistor (MOSFET), a bipolar junction transistor (BJT), and an insulated gate bipolar transistor (IGBT).

13. The switching mode power supply of claim 11, further comprising a DC voltage supplying unit for converting AC voltage into DC voltage and supplying the DC voltage to the voltage output unit and the switching controller.

14. The switching mode power supply of claim 11, wherein when the sensing voltage of the switching device is higher than a rated voltage, the over voltage controller determines an output voltage of a system as exceeding the rated voltage.

15. The switching mode power supply of claim 11, wherein over voltage controller comprises a RS latch for generating a signal controlling the LEB time and the MOSFET Gate Drive Current by using the first output voltage and an output signal according to a result of counting the clock signal after a beginning time of the over current state.

* * * * *

UNITED STATES PATENT AND TRADEMARK OFFICE
CERTIFICATE OF CORRECTION

PATENT NO.         : 7,760,520 B2                                                Page 1 of 1
APPLICATION NO. : 11/639005
DATED              : July 20, 2010
INVENTOR(S)        : Kyung Oun Jang and Yoo-Woong Hwang It is certified that error appears in the above-identified patent and that said Letters Patent is hereby corrected as shown below:

On the Title Page:
Under Item (30) Foreign Application Priority Data
Delete "Dec. 14, 2006" and insert --Dec. 14, 2005--.

Signed and Sealed this

Twenty-sixth Day of October, 2010

David J. Kappos
*Director of the United States Patent and Trademark Office*